United States Patent
Yu et al.

(10) Patent No.: US 11,156,147 B1
(45) Date of Patent: Oct. 26, 2021

(54) PRECHAMBER DEVICE FOR INTERNAL COMBUSTION ENGINE

(71) Applicant: SAUDI ARABIAN OIL COMPANY, Dhahran (SA)

(72) Inventors: Xin Yu, New Hudson, MI (US); Anqi Zhang, Canton, MI (US)

(73) Assignee: ARAMCO SERVICES COMPANY, Houston, TX (US)

( * ) Notice: Subject to any disclaimer, the term of this patent is extended or adjusted under 35 U.S.C. 154(b) by 0 days.

(21) Appl. No.: 17/109,760

(22) Filed: Dec. 2, 2020

(51) Int. Cl.
| F02B 19/12 | (2006.01) |
| F02P 13/00 | (2006.01) |
| F02B 19/10 | (2006.01) |
| F02B 1/04 | (2006.01) |

(52) U.S. Cl.
CPC .............. *F02B 19/12* (2013.01); *F02P 13/00* (2013.01); *F02B 1/04* (2013.01); *F02B 19/108* (2013.01); *F02B 19/1023* (2013.01)

(58) Field of Classification Search
CPC .... F02B 19/12; F02B 19/1023; F02B 19/108; F02B 1/04; F02P 13/00
USPC ........................................................ 123/260
See application file for complete search history.

(56) References Cited

U.S. PATENT DOCUMENTS

| 3,777,724 A | 12/1973 | Kiley |
| 3,919,984 A | 11/1975 | Yagi et al. |
| 5,333,582 A | 8/1994 | Kawamura |
| 5,454,356 A * | 10/1995 | Kawamura ............... F01L 3/20 123/254 |
| 5,826,558 A | 10/1998 | Kawamura |
| 5,950,593 A * | 9/1999 | Matsuoka ............... F02B 19/02 123/292 |
| 8,327,821 B2 * | 12/2012 | Guibert .................... F02B 9/00 123/275 |
| 2003/0056749 A1 * | 3/2003 | Beckertgis ............. F02B 19/02 123/292 |
| 2013/0160726 A1 | 6/2013 | Zajac |
| 2014/0144406 A1 | 5/2014 | Schock et al. |
| 2014/0261298 A1 | 9/2014 | Sasidharan et al. |
| 2015/0184578 A1 | 7/2015 | Oda et al. |
| 2015/0233280 A1 | 8/2015 | Ernst et al. |

(Continued)

FOREIGN PATENT DOCUMENTS

| JP | 2847314 B2 | 1/1999 |
| JP | 3695019 B2 | 9/2005 |
| JP | 2010265835 A | 11/2010 |

*Primary Examiner* — Mahmoud Gimie
(74) *Attorney, Agent, or Firm* — Osha Bergman Watanabe & Burton LLP

(57) ABSTRACT

A prechamber device includes an enclosure body and a cap forming an enclosed volume. The enclosure body has an orifice at one end. A precombustion chamber is defined within the enclosed volume and is in fluid communication with the orifice. A valve plug is movable along an axial axis of the enclosure body to adjust a valve opening at the orifice to a range of positions from a fully open position to a closed position. An actuator is coupled to the cap and the valve plug and is controllable to displace the valve plug along the axial axis of the enclosure body. The prechamber device is operable to generate turbulent jets that are directed into a main combustion chamber of an engine cylinder through the valve opening. During an engine cycle, the valve opening is controlled between the range of positions based on detected engine speed and engine load.

20 Claims, 10 Drawing Sheets

(56) References Cited

U.S. PATENT DOCUMENTS

| | | |
|---|---|---|
| 2017/0226922 A1 | 8/2017 | Tozzi et al. |
| 2019/0032543 A1 | 1/2019 | Koshiba et al. |

* cited by examiner

PRECHAMBER DEVICE FOR INTERNAL COMBUSTION ENGINE

BACKGROUND

Prechambers are used to combust a small quantity of fuel and produce turbulent jets, which can be ejected into a main combustion chamber of an engine to initiate combustion of a compressed fuel-air mixture in the main combustion chamber. The turbulent jets provide distributed ignition sites that enable high burn rates of the fuel-air mixture in the main combustion chamber. Prechamber combustion can improve engine efficiency and reduce emission by providing fast combustion, better dilution tolerance, and lower knock tendency.

Prechambers use nozzles to eject turbulent jets into the main combustion chamber and to scavenge the prechamber. These nozzles typically have fixed-size openings, which pose challenges to operation of the engine under all speed load conditions. Nozzles with smaller openings produce higher velocity jets with poor scavenging capability and greater heat loss. Nozzles with bigger openings produce lower velocity jets with better scavenging capability and lower heat loss. In general, an engine operating under high load knocking condition will benefit from higher velocity jets, whereas an engine operating under low load and cold condition will benefit from lower heat loss. If the nozzle openings are fixed at a size to reduce knock tendency, the engine will have a low performance when operating under low load and cold condition. On the other hand, if the nozzle openings are fixed at a size to perform efficiently under low load and cold condition, the engine will have increased knock tendency.

SUMMARY

In a first summary example, a prechamber device includes an enclosure body. An orifice is formed at a first end of the enclosure body, and a cap is disposed at a second end of the enclosure body. The cap and the enclosure body form an enclosed volume. The prechamber device includes a precombustion chamber defined within the enclosed volume and fluidly connected to the orifice. The prechamber device includes a valve plug that is movable along an axial axis of the enclosure body to selectively adjust a valve opening at the orifice to a position in a range from a fully open position to a closed position. An actuator is coupled to the cap and the valve plug. The actuator is controllable to displace the valve plug along the axial axis of the enclosure body. In certain cases, the prechamber device may include a spark plug positioned to have a tip that is exposed to the precombustion chamber. In certain cases, the valve plug may include a valve stem and a valve head disposed at one end of the valve stem. The valve stem may traverse the precombustion chamber and may be movable along the axial axis of the enclosure body. A position of the valve head relative to a wall of the orifice may be adjustable by movement of the valve stem along the axial axis of the enclosure body. In certain cases, the valve head may engage the wall of the orifice when the valve opening is at the closed position. In certain cases, the prechamber device may include a spring that is positioned to normally bias the valve head into engagement with the wall of the orifice. In certain cases, the prechamber device may include a valve guide that is disposed within the enclosed volume. The valve guide may have a first opening aligned to receive the valve stem and guide movement of the valve stem along the axial axis of the enclosure body. In certain cases, the precombustion chamber may be defined in a portion of the enclosed volume between the valve guide and a portion of the enclosure body including the orifice. In certain cases, the spark plug may extend through a second opening in the valve guide to expose the tip of the spark plug to the precombustion chamber. In certain cases, the spark plug may extend into the enclosed volume through the cap. In certain cases, the prechamber device may include a fuel injector that is positioned to have a nozzle that is exposed to the precombustion chamber. In certain cases, the fuel injector and the spark plug may extend into the enclosed volume through the cap. In certain cases, the actuator may be a solenoid actuator or a piezo actuator.

In a second summary example, an internal combustion engine includes at least one engine cylinder in which a main combustion chamber is defined. The internal combustion engine includes an enclosure body having an orifice formed at its first end and a cap disposed at its second end. The enclosure body is positioned relative to the at least one engine cylinder to expose the first end to the main combustion chamber. The cap and the enclosure body form an enclosed volume. The internal combustion engine includes a precombustion chamber defined within the enclosed volume and fluidly connected to the orifice. The internal combustion engine includes a valve plug that is movable along an axial axis of the enclosure body to selectively adjust a valve opening at the orifice to a position in a range from a fully open position to a closed position. The internal combustion engine includes an actuator that is coupled to the cap and the valve plug. The actuator is controllable to displace the valve plug along the axial axis of the enclosure body. In certain cases, the internal combustion engine may include a spark plug, which may be coupled to the cap and positioned to have a tip that is exposed to the precombustion chamber. In certain cases, the internal combustion engine may include a fuel injector that is coupled to the cap and positioned to have a nozzle that is exposed to the precombustion chamber.

In a third summary example, a method of operating an internal combustion engine includes controlling a valve opening at an end of a prechamber device exposed to a main combustion chamber of an engine cylinder to a fully open position. The method includes supplying a fuel and air into the main combustion chamber to provide a fuel-air mixture inside the main combustion chamber. While supplying the fuel and air into the main combustion chamber, a portion of the fuel and air from the main combustion chamber is provided to a precombustion chamber inside the prechamber device through the valve opening. The method includes compressing the fuel-air mixture inside the main combustion chamber. During at least a portion of compressing the fuel-air mixture inside the main combustion chamber, an engine speed and an engine load are detected. The valve opening is controlled to a position in a range from the fully open position to a closed position based on the detected engine speed and engine load. The method includes igniting the portion of the fuel and air inside the precombustion chamber to generate turbulent jets that are directed from the precombustion chamber into the main combustion chamber through the valve opening. The method includes combusting the compressed fuel-air mixture inside the main combustion chamber by the turbulent jets. The method includes removing exhaust gases generated by combustion of the fuel-air mixture from the main combustion chamber. In certain cases, the method may include controlling the valve opening to the position in the range from the fully open position to the closed position during an initial period of combusting the fuel-air mixture inside the main combustion chamber. The method may include controlling the valve opening to the closed position during a remaining period of combusting the fuel-air mixture inside the main combustion chamber. In certain cases, the method may include controlling the valve opening to the closed position during removing exhaust gases from the main combustion chamber. In certain cases, the portion of the fuel and air inside the precombustion chamber may be ignited while the valve opening is controlled to the position in the range from the fully open position to the closed position. In certain cases, the portion of the fuel and air inside the precombustion chamber is ignited at a select time during compressing the fuel-air mixture inside the main combustion chamber. In certain cases, a fuel may be directly injected into the precombustion chamber from outside the main combustion chamber during at least a portion of providing the portion of the fuel and air from the main combustion chamber to the precombustion chamber.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
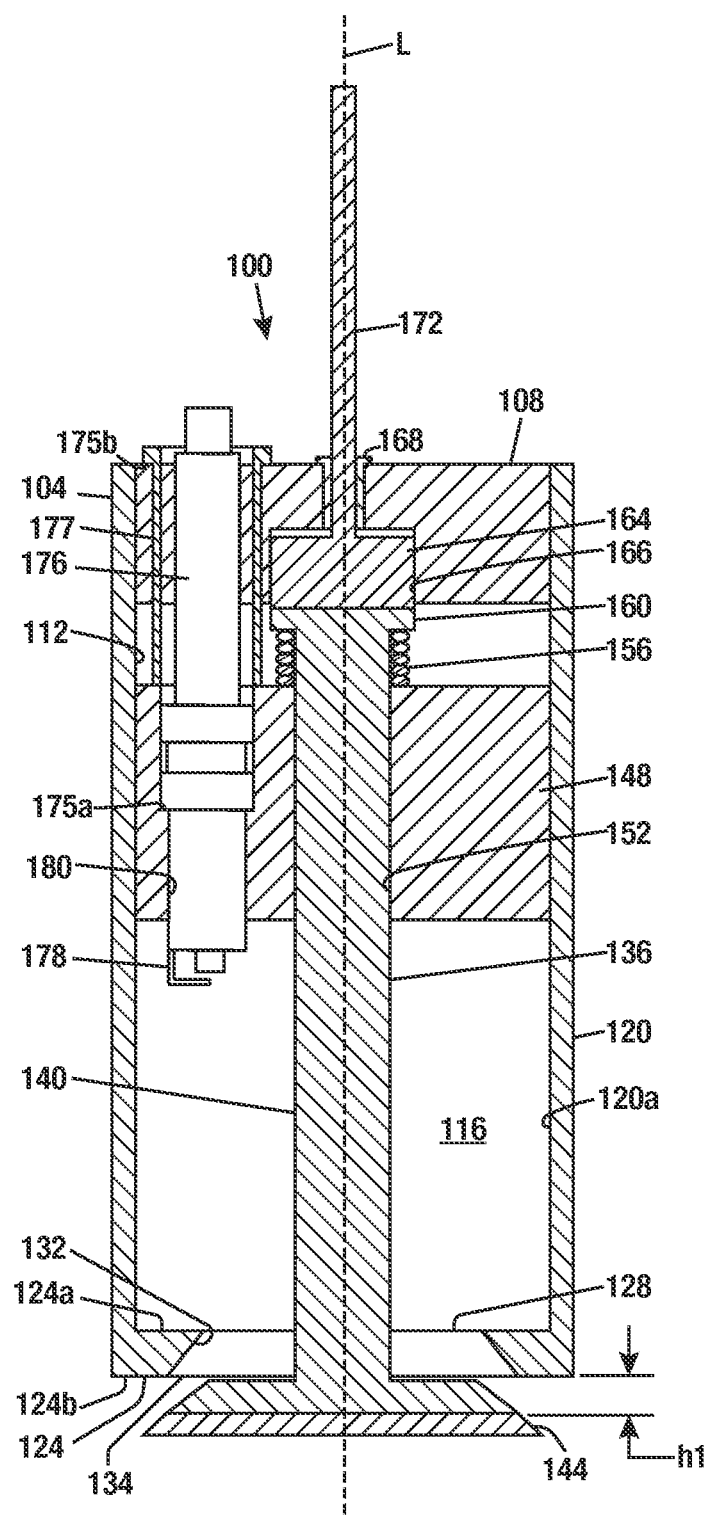
FIG. 1 is a cross-sectional view of a prechamber device with a valve opening shown in a fully open position.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, related well known features or processes have not been shown or described in detail to avoid unnecessarily obscuring the implementations and embodiments. For the sake of continuity, and in the interest of conciseness, same or similar reference characters may be used for same or similar objects in multiple figures.

Prechamber devices described herein have valve openings that are controllable to enable optimization of scavenging and jet combustion characteristics for internal combustion engines. The valve openings can be controlled to a position in a range from a fully open position to a closed position within one engine cycle to allow desired gas flow between the main combustion chamber and the prechamber. By opening the prechamber at optimized timing and open state, the residual content of the prechamber and the injected jet combustion are optimized, thereby improving the overall combustion behavior of the internal combustion engine.

FIG. 1 shows an illustrative implementation of a prechamber device 100 including an enclosure body 104 and a cap 108 mounted at an open end of enclosure body 104 to form an enclosed volume 112. A precombustion chamber 116 is defined within enclosed volume 112. In one example, enclosure body 104 includes an enclosure side wall 120 and an enclosure bottom wall 124 that closes the bottom end of enclosure side wall 120. In one example, precombustion chamber 116 occupies a portion of enclosed volume 112 adjacent to enclosure bottom wall 124. Enclosure side wall 120 may be cylindrical in shape. Bottom wall 124 may be planar in shape, i.e., inner surface 124a and outer surface 124b of bottom wall 124 are flat and parallel to each other. Alternatively, bottom wall 124 may be non-planar in shape, e.g., bottom wall 124 may have a beveled or curved shape. Cap 108 may be mounted at the open end of enclosure body 104 using any suitable method, such as by welding cap 108 to enclosure side wall 120 or by making up a threaded connection between cap 108 and enclosure side wall 120 or by bolting cap 108 to enclosure side wall 120 using flanges (not shown) provided on cap 108 and enclosure side wall 120. Preferably, the method used to mount cap 108 at the open end of enclosure body 104 provides a hermetic seal between cap 108 and enclosure body 104.

An orifice 128 is formed in enclosure bottom wall 124 to provide prechamber device 100 with a nozzle. Orifice 128 extends through a thickness of enclosure bottom wall 124, from inner surface 124a of enclosure bottom wall 124 to outer surface 124b of enclosure bottom wall 124. Orifice 128 is connected to precombustion chamber 116, allowing flow communication between precombustion chamber 116 and an external environment, such as a main combustion chamber. In one implementation, orifice 128 has a variable size across the thickness of enclosure bottom wall 124, i.e., orifice 128 is defined by an orifice wall 132 that is not straight. In one example, orifice 128 may be a tapered orifice defined by a tapered orifice wall 132. In one example, the size of orifice 128 at outer surface 124b may be greater than the size of orifice 128 at inner surface 124a, i.e., orifice 128 tapers inwardly. In one implementation, orifice 128 may have an axial axis that is aligned with an axial axis L of enclosure body 104. In one example, a cross-section of orifice 128 in a plane transverse to axial axis L of enclosure body 104 may be circular or oval.

A valve opening 134 at orifice 128 has a position that is adjustable in a range from a fully open position to a closed position. Valve opening 134 may be defined as the effective flow area of orifice 128 at outer surface 124b. When valve opening 134 is at the fully open position, resistance to flow through orifice 128 is at a minimum value. When valve opening 134 is at the closed position, resistance to flow through orifice 128 is at a maximum value. Valve opening 134 can be at a controlled open position in between the fully open position and the closed position. The controlled open position is wider, i.e., more open, in a direction towards the fully open position and narrower, i.e., less open, in a direction towards the closed position.

Figure 2:
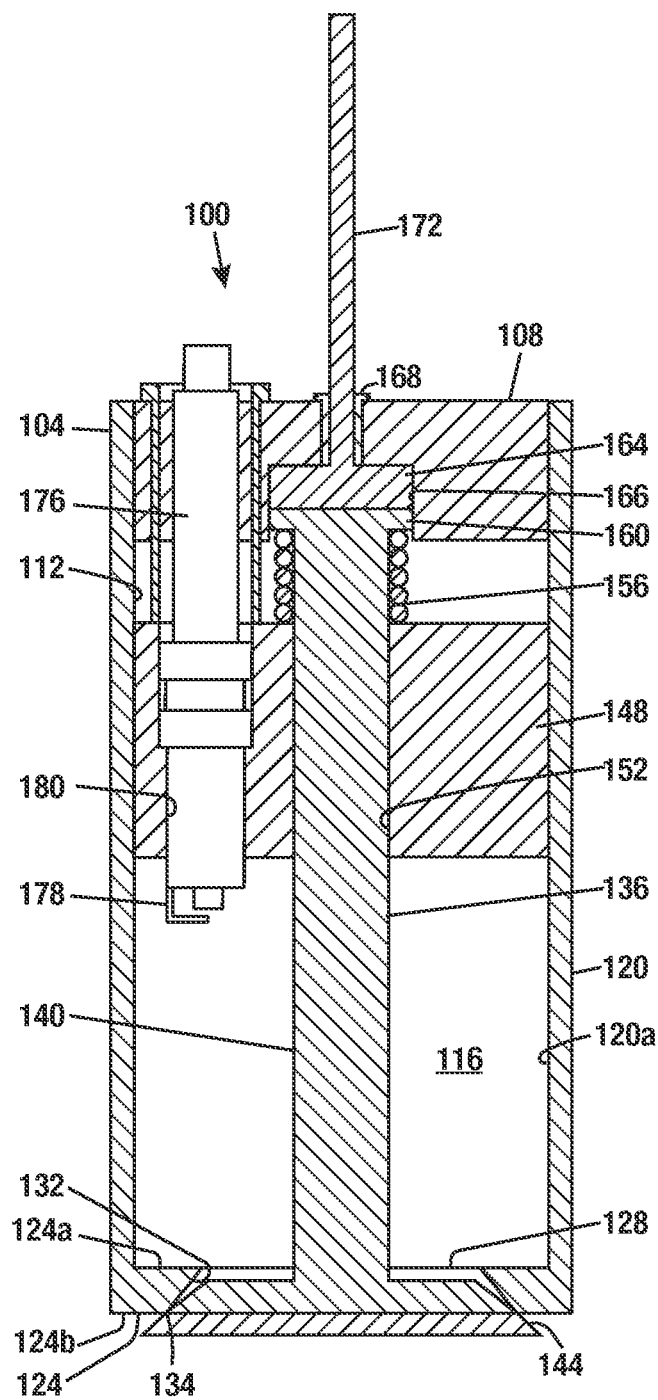
FIG. 2 is a cross-sectional view of the prechamber device of FIG. 1 with the valve opening shown in a closed position.

The position of valve opening 134 is adjustable by a valve plug 136. In one example, valve plug 136 includes a valve stem 140 and a valve head 144 disposed at an end of valve stem 140. Valve stem 140 is movable along axial axis L of enclosure body 104 to change a position of valve head 144 relative to orifice 128 and orifice wall 132 and thereby change the position of valve opening 134. When valve opening 134 is at the fully open position, as shown in FIG. 1, valve head 144 is not disposed within orifice 128 and does not engage orifice wall 132. When valve opening 134 is at the closed position, as shown in FIG. 2, at least a portion of valve head 144 is disposed within orifice 128 and valve head 144 engages orifice wall 132, effectively closing the valve opening. For illustrative purposes, the lift needed to move valve head 144 from the fully open position to the closed position is indicated as h1 in FIG. 1.

Figure 3:
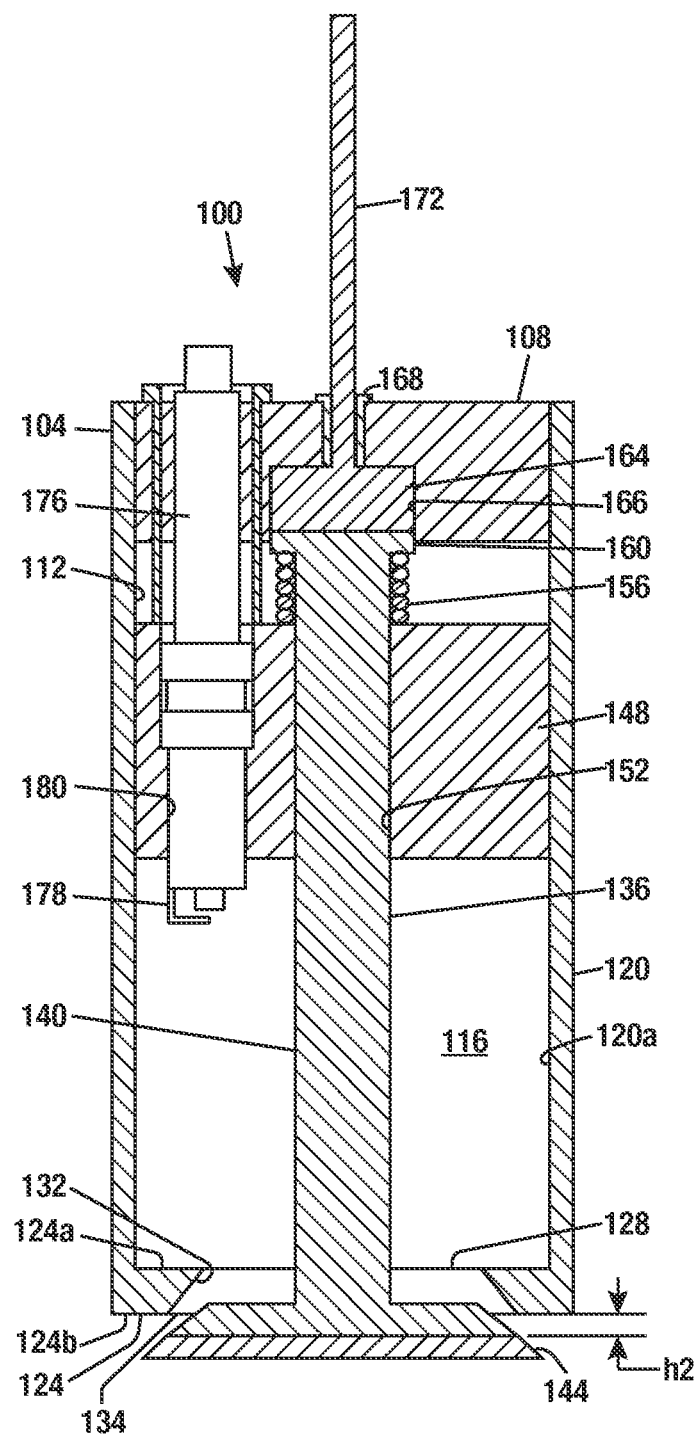
FIG. 3 is a cross-sectional view of the prechamber device of FIG. 1 with the valve opening shown in a controlled open position.

FIG. 3 illustrates valve opening 134 at a controlled open position between the fully open position and the closed position. In the controlled open position, a portion of valve head 144 is disposed within orifice 128, but valve head 144 does not engage orifice wall 132. For illustrative purposes, the lift needed to move valve head 144 from the controlled open position shown in FIG. 3 to the closed position is indicated as h2. The closer h2 is to h1 (in FIG. 1), the wider the valve opening. The closer h2 is to zero, the narrower the valve opening. The controlled open position can be any position between the fully open position and the closed position and can be based on engine operating parameters, such as engine speed and engine load.

Referring to FIGS. 1-3, valve stem 140 traverses precombustion chamber 116 to enable positioning of valve head 144 in and out of orifice 128. Valve head 144 may be axially aligned with orifice 128, as shown. Both valve head 144 and valve stem 140 may be axially aligned with enclosure body 104, i.e., aligned along axial axis L, as shown. A valve guide 148 is arranged within enclosed volume 112. In one example, valve guide 148 may have a disk shape to fit within enclosure side wall 120 with a cylindrical shape. Valve guide 148 may be fixed in place by attaching valve guide 148 to an inner surface 120a of enclosure side wall 120 using any suitable method. Precombustion chamber 116 may be located in the portion of enclosed volume 112 between valve guide 148 and enclosure bottom wall 124. In one implementation, valve guide 148 includes an opening 152 in which valve stem 140 is received and along which valve stem 140 moves. The axial axis of opening 152 may be aligned with axial axis L of enclosure body 104 to guide movement of valve stem 140 along axial axis L.

Valve plug 136 may be supported on valve guide 148 by means of a spring 156. For example, spring 156 may be arranged between a flange 160 at an end of valve stem 140 and an end of valve guide 148. Spring 156 may be arranged to bias flange 160 in a direction towards cap 108, which would bias valve head 144 against orifice wall 132 so that the valve opening is normally in the closed position, as shown in FIG. 2. Valve opening 134 may be adjusted to the fully open position or controlled open position by applying a force to valve plug 136 that overcomes the biasing force of spring 156, as shown in FIGS. 1 and 3.

An actuator 164 provides the motive force to displace valve plug 136 (or valve stem 140) along axial axis L of enclosure body 104. In order to precisely control the position of valve opening 134 during an engine cycle, actuator 164 may be a solenoid actuator or a piezo actuator or other actuator that can have a variable actuator length in a very short period of time, e.g., on the order of milliseconds. In the illustrated example, actuator 164 is positioned near cap 108. Actuator 164 may be disposed in a recess 166 formed in cap 108 and exposed to enclosed volume 112. Cap 108 may include a feedthrough 168 for a wiring 172 of actuator 164. Preferably, feedthrough 168 is a sealed feedthrough to prevent gas leakage from enclosed volume 112 at cap 108. Actuator 164 is positioned to apply a force to valve plug 136. As an example, actuator 164 may be positioned to contact flange 160 at the end of valve stem 140. The biasing force of spring 156 may urge flange 160 against actuator 164 and maintain contact between flange 160 and actuator 164 as actuator 164 expands and contracts to change the position of valve head 144. Recess 166 is aligned with valve plug 136 such that flange 160 may slide into and out of recess 166 in contact with actuator 164 as actuator 164 contracts and expands.

Prechamber device 100 includes a spark plug 176 extending into enclosed volume 112 through cap 108. Spark plug 176 may be attached to cap 108 using any suitable method, such as by a threaded connection. Preferably, the method used to attach spark plug 176 to cap 108 provides a hermetic seal between the spark plug 176 and cap 108. For example, a sleeve 177 going through cap 108 to valve guide 148 and wrapping around an upper part of spark plug 176 together with sealing surfaces 175a, 175b may prevent gas leakage from enclosed volume 112 at cap 108. Sealing surface 175a is formed at the seating surface of spark plug 176, and sealing surface 175b is formed at the interface between the top of cap 108 and sleeve 177. Spark plug 176 extends through an opening 180 in valve guide 148 in order to position tip 178 of spark plug 176 inside precombustion chamber 116. In some cases (not shown), spark plug 176 may be mounted to enclosure side wall 120 instead of cap 108. In this case, the tip of spark plug 176 may be positioned inside precombustion chamber 116 by extending spark plug 176 through an opening in enclosure side wall 120.

Figure 4:
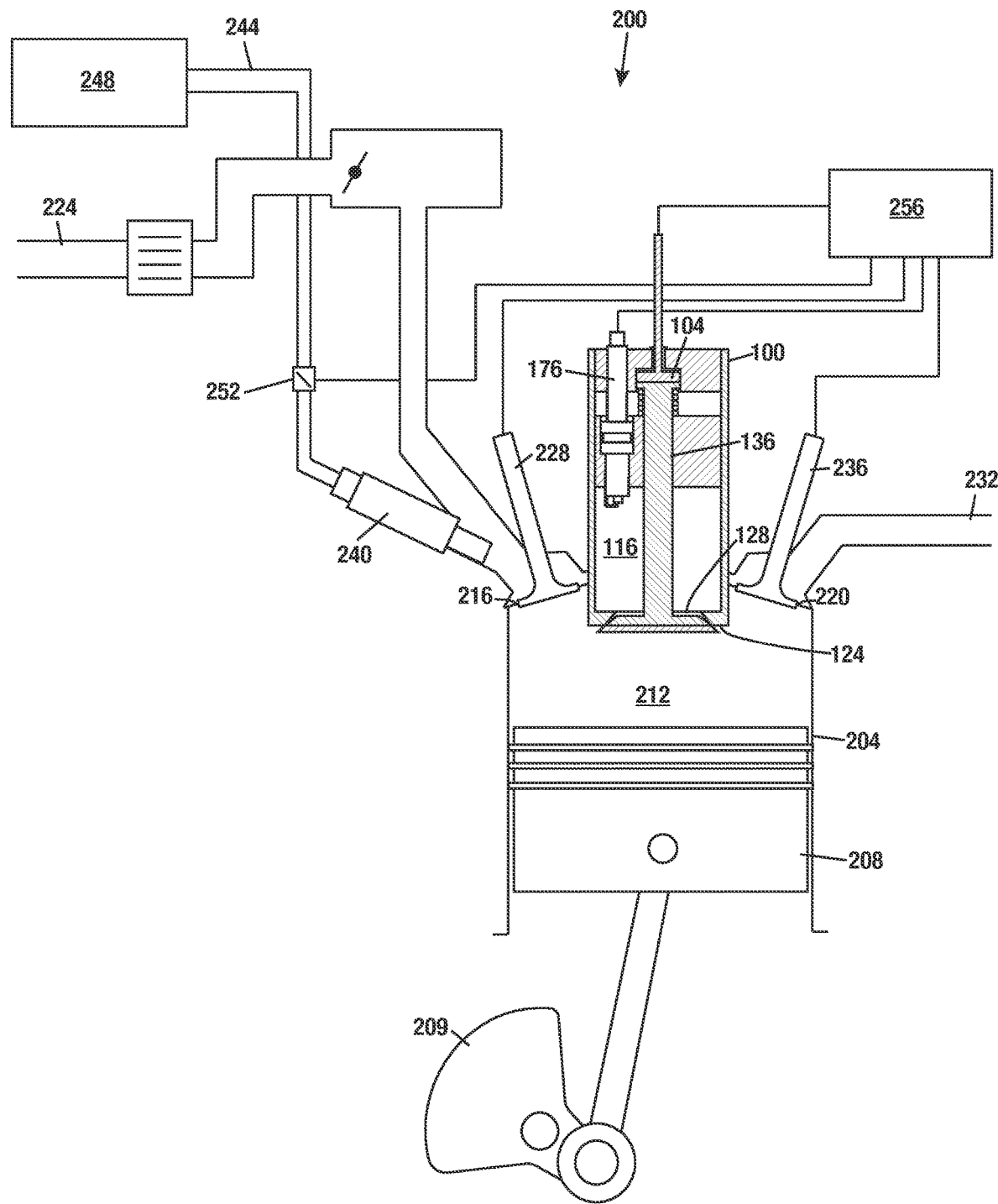
FIG. 4 is a schematic diagram showing the prechamber device of FIGS. 1-3 operatively coupled to an internal combustion engine.

FIG. 4 illustrates an internal combustion engine 200 including an engine cylinder 204 formed within an engine body or engine block (not shown separately). For ease of illustration, engine 200 is shown with a single cylinder. However, engine 200 is not limited to a single cylinder and may have multiple cylinders. A piston 208 is arranged to move back and forth inside cylinder 204. Piston 208 is connected to a crankshaft 209, which converts the reciprocating motion of the piston into rotary motion, as is well known in the relevant art. Main combustion chamber 212 is defined within cylinder 204. The volume of main combustion chamber 212 depends on the position of piston 208 within cylinder 204. The head of cylinder 204 includes an intake port 216 and an exhaust port 220. Intake port 216 is in fluid communication with an intake line 224. An intake valve 228 is arranged at intake port 216 to control flow of air from intake line 224 into main combustion chamber 212. The air from intake line 224 may be ambient air or a mixture of ambient air and recirculated exhaust gases. Exhaust port 220 is in fluid communication with an exhaust line 232. An exhaust valve 236 is arranged at exhaust port 220 to control flow of exhaust gases from main combustion chamber 212 into exhaust line 232.

A fuel injector 240 is connected to a fuel line 244, which is in communication with a fuel supply 248. Fuel injector 240 is positioned to inject fuel into the air flowing to intake port 216 from intake line 224. A valve 252 may control flow of fuel from fuel line 244 into fuel injector 240. The air flowing to intake port 216 entrains the fuel from fuel injector 240, delivering a fuel-air mixture into main combustion chamber 212 when valve 228 is open. Alternatively, a fuel injector connected to fuel line 244 may be positioned to inject fuel from fuel line 244 directly into main combustion chamber 212, e.g., through an opening at a side of cylinder 204, rather than into the air flowing to intake port 216. Inside main combustion chamber 212, the fuel injected directly into main combustion chamber 212 will mix with the air from intake port 216. Alternatively, both injection of fuel through intake port 216 and direct injection of fuel into main combustion chamber 212 may be used. Opening and closing of valves 228, 236, 252 during an engine cycle may be controlled by an engine control unit (ECU) (or computer) 256.

Prechamber device 100 is mounted at the head of cylinder 204 such that at least a portion of the prechamber device is disposed inside or exposed to main combustion chamber 212. In particular, at least enclosure bottom wall 124 that includes orifice 128, or the nozzle of the prechamber device, is disposed inside or exposed to main combustion chamber 212. Operation of actuator 104 and spark plug 176 may be controlled by ECU 256.

Figure 5A:
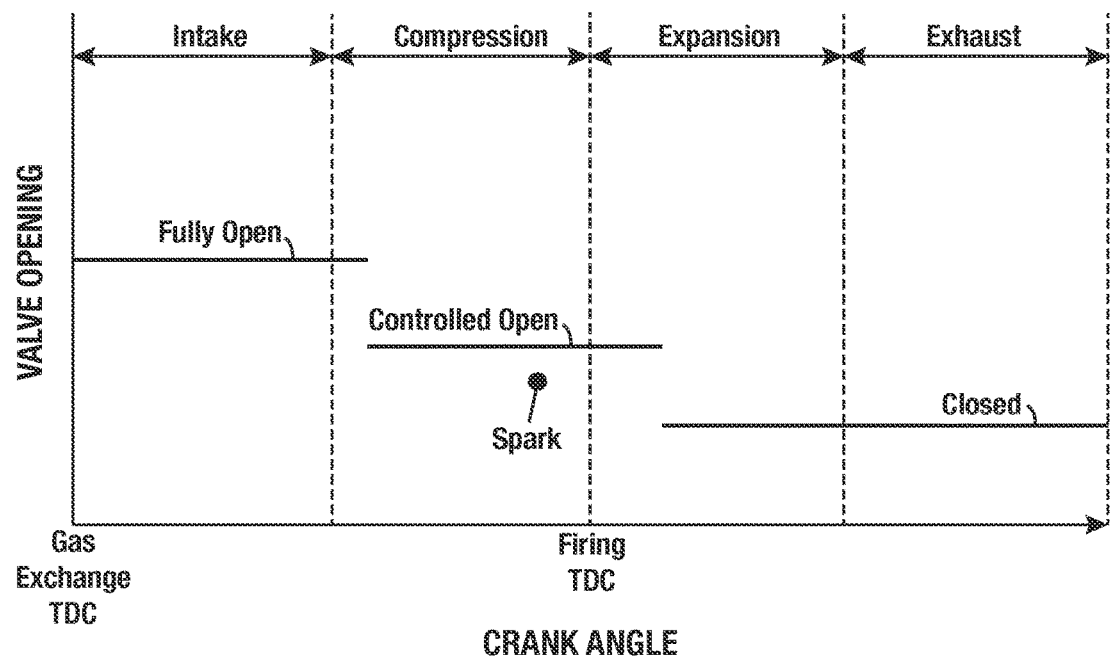
FIG. 5A illustrates positions of a prechamber valve opening during an engine cycle.
Figure 6A:
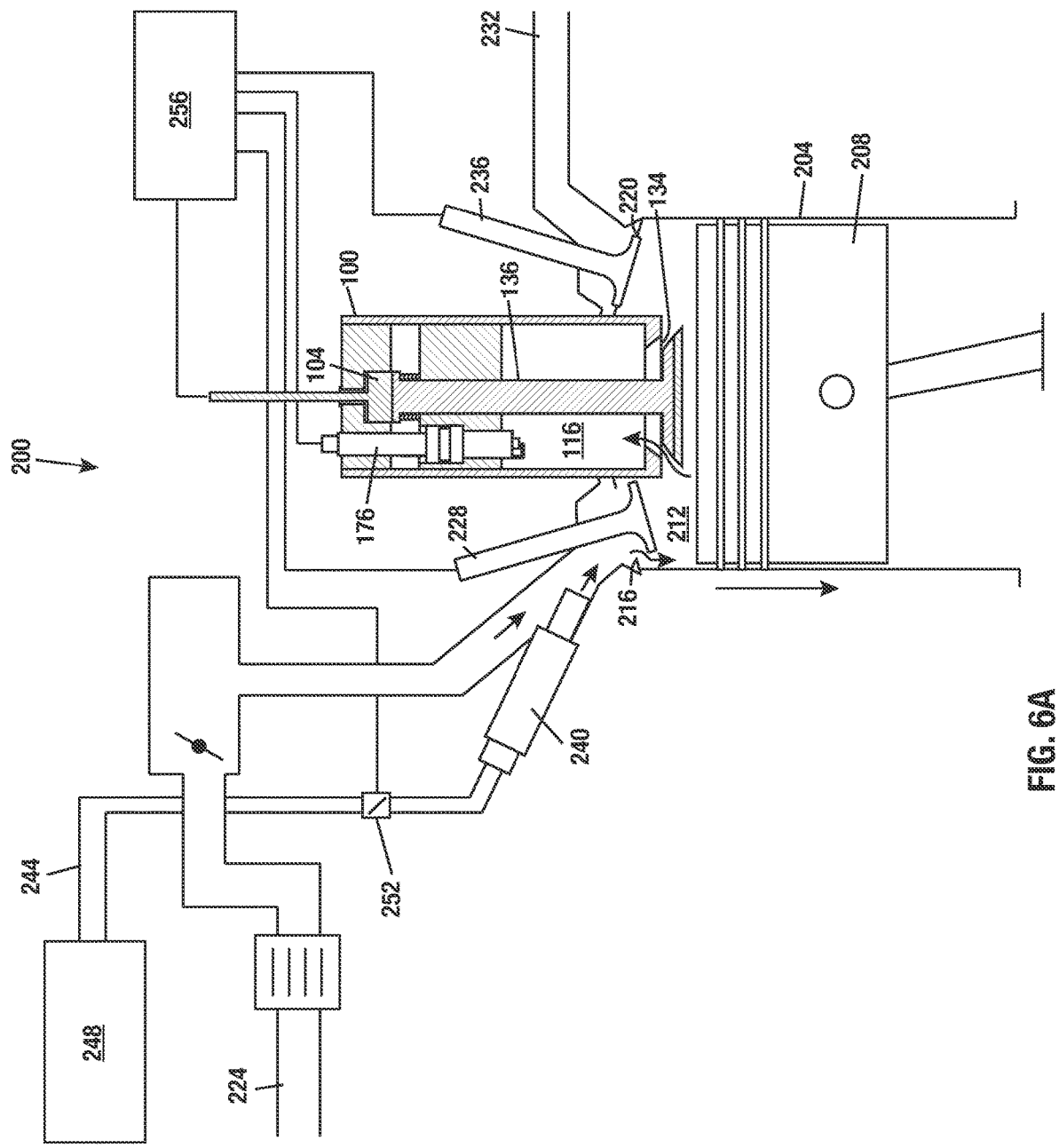
FIG. 6A is a schematic diagram showing the engine of FIG. 4 at the beginning of an intake stroke.

In one example, cylinder 204 operates on a four-stroke cycle including an intake stroke, a compression stroke, a power stroke, and an exhaust stroke. FIG. 5A illustrates an example positioning of the prechamber valve opening during an engine cycle. During the intake stroke, intake valve 228 and fuel valve 252 are open and exhaust valve 236 is closed, as shown in FIG. 6A. Fuel and air are supplied into main combustion chamber 212 to form a fuel-air mixture in main combustion chamber 212. Actuator 104 is controlled to place valve opening 134 of prechamber device 100 in the fully open position, which would allow the fuel-air mixture from main combustion chamber 212 to enter and fill precombustion chamber 116. At the beginning of the intake stroke, piston 208 is at the top dead center (TDC) position for gas exchange, which is the farthest position of the piston from the crank for the intake stroke. As main combustion chamber 212 fills with gas, i.e., air mixed with fuel, piston 208 will move to the bottom dead center (BDC) position for gas exchange, which is the closest position of the piston to the crank for the intake stroke. At the end of the intake stroke, intake valve 228 and fuel valve 252 are closed. However, prechamber valve opening 134 remains fully open (as shown in FIG. 5A). Exhaust valve 236 remains closed. Piston 208 will be at the BDC position.

Figure 6B:
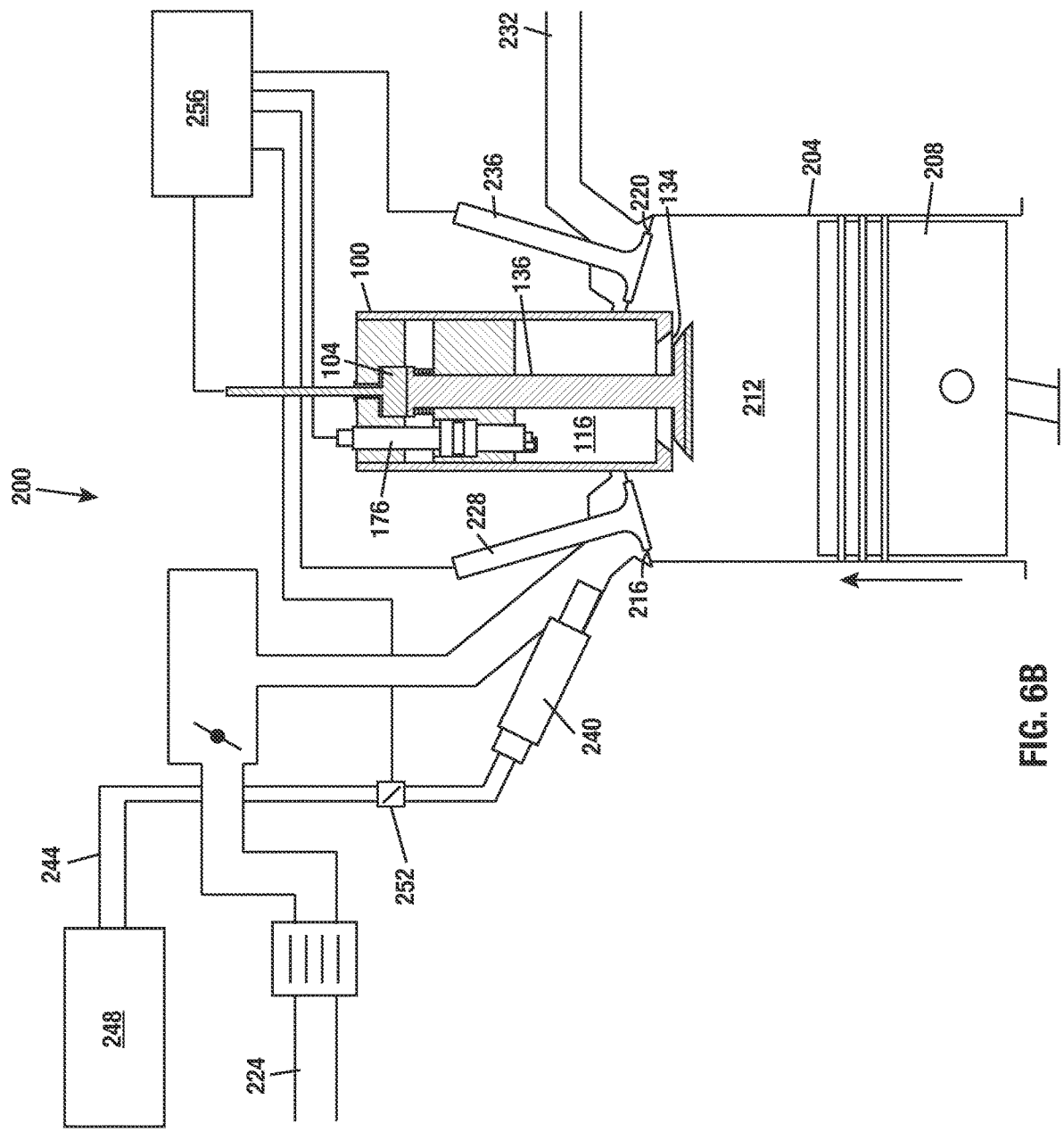
FIG. 6B is a schematic diagram showing the engine of FIG. 4 at the beginning of a compression stroke.

The compression stroke starts after completion of the intake stroke. During the compression stroke, intake valve 228, fuel valve 252, and exhaust valve 236 are closed, as shown in FIG. 6B. At the beginning of the compression stroke, prechamber valve opening 134 is fully open. At some time during the compression stroke, prechamber valve opening 134 is adjusted to controlled open (as shown in FIG. 5A) to allow the proper turbulence, flow, and mixing characteristics to be obtained in precombustion chamber 116, which will enable the optimal jet ignition process in main combustion chamber 212. In one example, the engine speed and engine load are detected by ECU 256 and used to determine the controlled open position. A production engine usually has an encoder to measure crankshaft rotational speed. The ECU can determine the engine speed from the output of the encoder. The engine load is pre-calibrated based on the amount of fuel injected at a certain engine speed. This information is also available to the ECU to use in determining engine load.

Figure 5B:
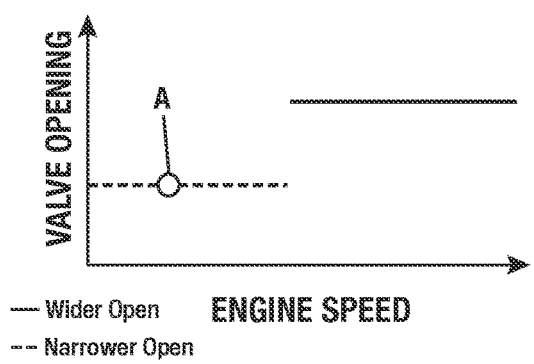
FIG. 5B illustrates a relationship between positions of a prechamber valve opening and engine speed.
Figure 5C:
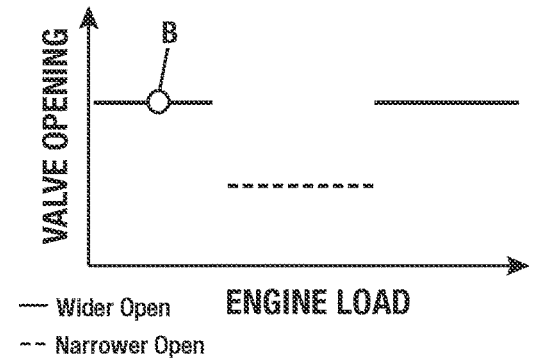
FIG. 5C illustrates a relationship between positions of a prechamber valve opening and engine load.

FIG. 5B shows a relationship between prechamber valve opening and engine speed. FIG. 5C shows a relationship between prechamber valve opening and engine load. Engine experiments were performed using different prechambers with fixed-size nozzles at different engine speeds and loads. The relationships shown in FIGS. 5B and 5C were deduced from these testing results. According to FIG. 5B, if engine speed is low, valve opening should be narrower open, i.e., relatively closer to closed position. If engine speed is high, valve opening should be wider open, i.e., relatively closer to fully open position. According to FIG. 5C, if engine load is low or high, valve opening should be wider open. If engine load is in a medium range, valve opening should be narrower open. As can be observed from FIGS. 5B and 5C, for some combinations of engine speed and engine load, such as a low engine speed and a low engine load, opposed positions of the valve opening may be indicated. For example, engine speed marked as A in FIG. 5B has a recommended valve opening that is narrower open, whereas engine load marked as B in FIG. 5C has a recommended valve opening that is wider open. In this case, an engine operation strategy may be used to select the controlled open position from the conflicting recommended valve opening positions. In general, when there is a conflicting recommendation for valve opening size, the dominant factor should be engine load. Failing to follow recommendations based on engine load could lead to severe engine performance degradation, whereas failing to follow recommendations based on engine speed could only cause minor engine efficiency reduction.

During the compression stroke, the fuel-air mixture in main combustion chamber 212 is compressed by movement of piston 208 in a direction towards the top of cylinder 204. This will push the fuel-air mixture in main combustion chamber 212 against valve opening 134 of prechamber device 100 in a position to readily interact with turbulent jets that will emanate from the prechamber device. FIG. 5A shows that at some point during the compression stroke, spark plug 176 of prechamber device 100 is fired. This would result in turbulent jets that are then ejected into main combustion chamber 212 through valve opening 134. FIG. 5A shows that spark plug 176 is fired with valve opening 134 of prechamber device 100 at controlled open, which means that the jets ejected into main combustion chamber 212 can have the proper characteristics to enable optimal ignition process inside main combustion chamber 212. At the end of the compression stroke, prechamber valve opening 134 remains at the controlled open position. Intake valve 228, fuel valve 252, and exhaust valve 236 remain closed.

The expansion stroke starts after completion of the compression stroke. During the expansion stroke, high-pressure gases produced from combustion of the fuel-air mixture in main combustion chamber 212 expand and push piston 208 down, generating force on the crank and shaft and useful work. FIG. 5A shows that the prechamber valve opening is at the controlled open position during an initial portion of the expansion stroke. Extending the controlled open duration to the initial stage of the expansion stroke will ensure that all the turbulent jets enter the main combustion chamber for improved combustion. FIG. 5A also shows that the prechamber valve opening is adjusted to the closed position during the remaining portion of the expansion stroke. Intake valve 228, fuel valve 252, and exhaust valve 236 remain closed during the expansion stroke.

Figure 6C:
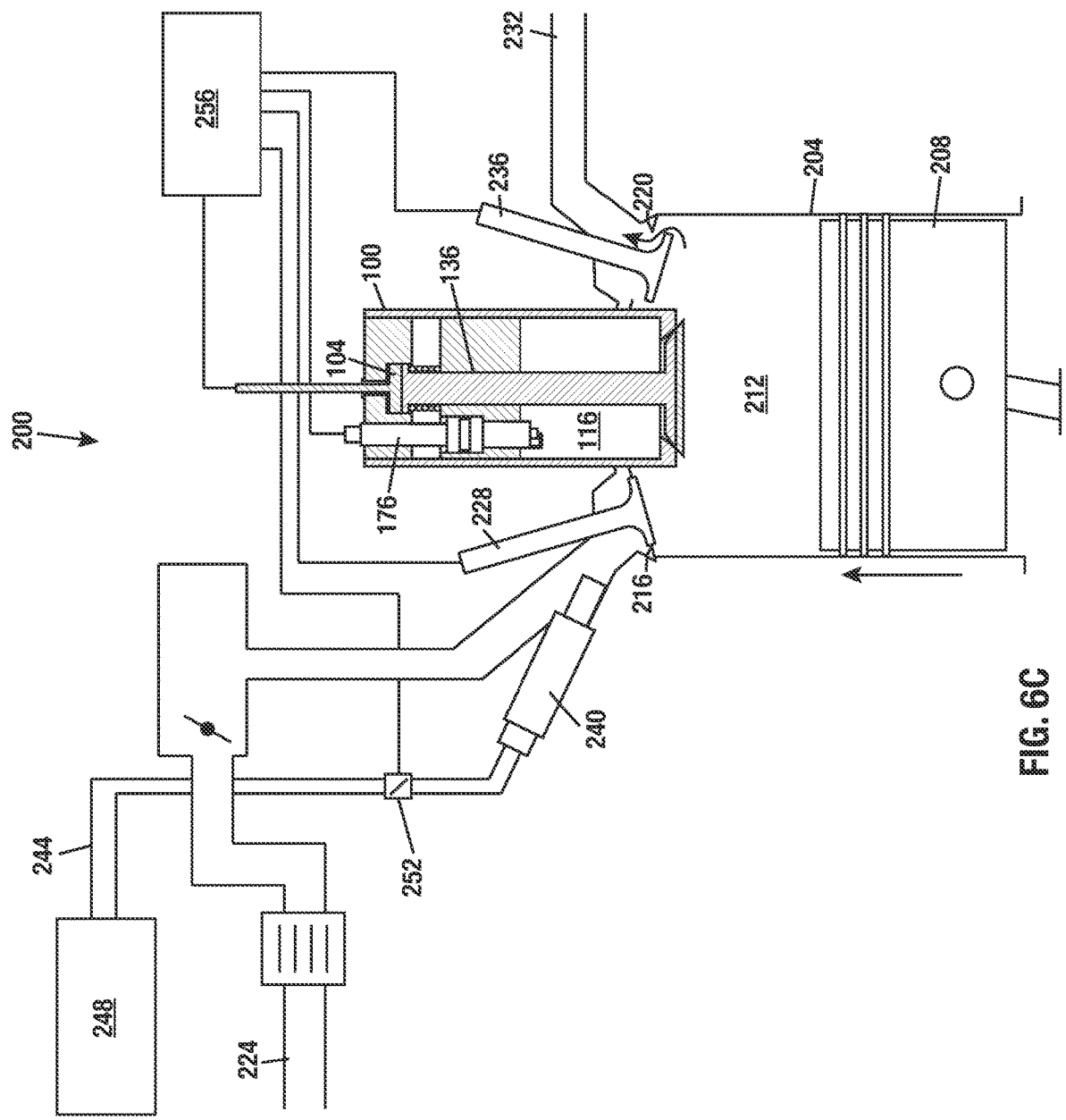
FIG. 6C is a schematic diagram showing the engine of FIG. 4 during an exhaust stroke.

The exhaust stroke starts after completion of the expansion stroke. During the exhaust stroke, exhaust valve 236 is open, as shown in FIG. 6C, and piston 208 pushes the exhaust gases out of main combustion chamber 212 into exhaust line 232. During the exhaust stroke, intake valve 228, fuel valve 252, and the prechamber valve opening are closed.

Figure 7:
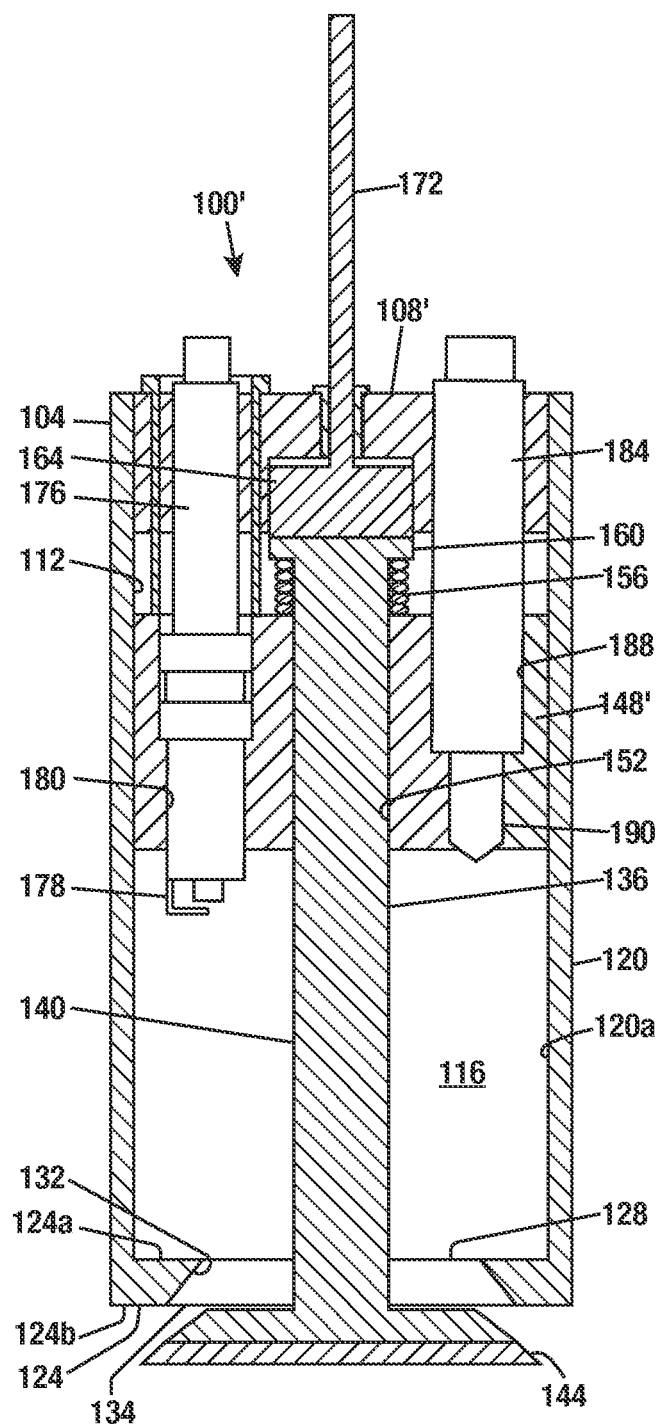
FIG. 7 is a cross-sectional view of the prechamber device of FIG. 1 modified to include a fuel injector.

FIG. 7 shows a variant 100' of prechamber device 100 (in FIGS. 1-3) with a fuel injector 184 arranged to deliver fuel to precombustion chamber 116 during the intake stroke. In the interest of continuity, FIG. 7 uses similar or the same reference characters as FIGS. 1-3 for similar or the same features. In some cases, the prime symbol (or single quote mark) may be used to indicate parts that specifically changed for variant 100'. In the example shown in FIG. 7, fuel injector 184 extends into enclosed volume 112 through cap 108'. Preferably, the method used to attach fuel injector to cap 108' provides a hermetic seal between fuel injector 184 and cap 108' in order to avoid gas leakage from enclosed volume 112. Fuel injector 184 extends into an opening 188 in valve guide 148', and a nozzle 190 of fuel injector 184 is exposed to precombustion chamber 116 through opening 188. In some cases (not shown), fuel injector 184 may be mounted to enclosure side wall 120 instead of cap 108. In these cases, the nozzle of fuel injector 184 may be exposed to precombustion chamber 116 through an opening in enclosure side wall 120. Prechamber device 100' has the same characteristics as described for prechamber device 100 in FIGS. 1-3 with respect to position and control of valve opening 134.

Figure 8:
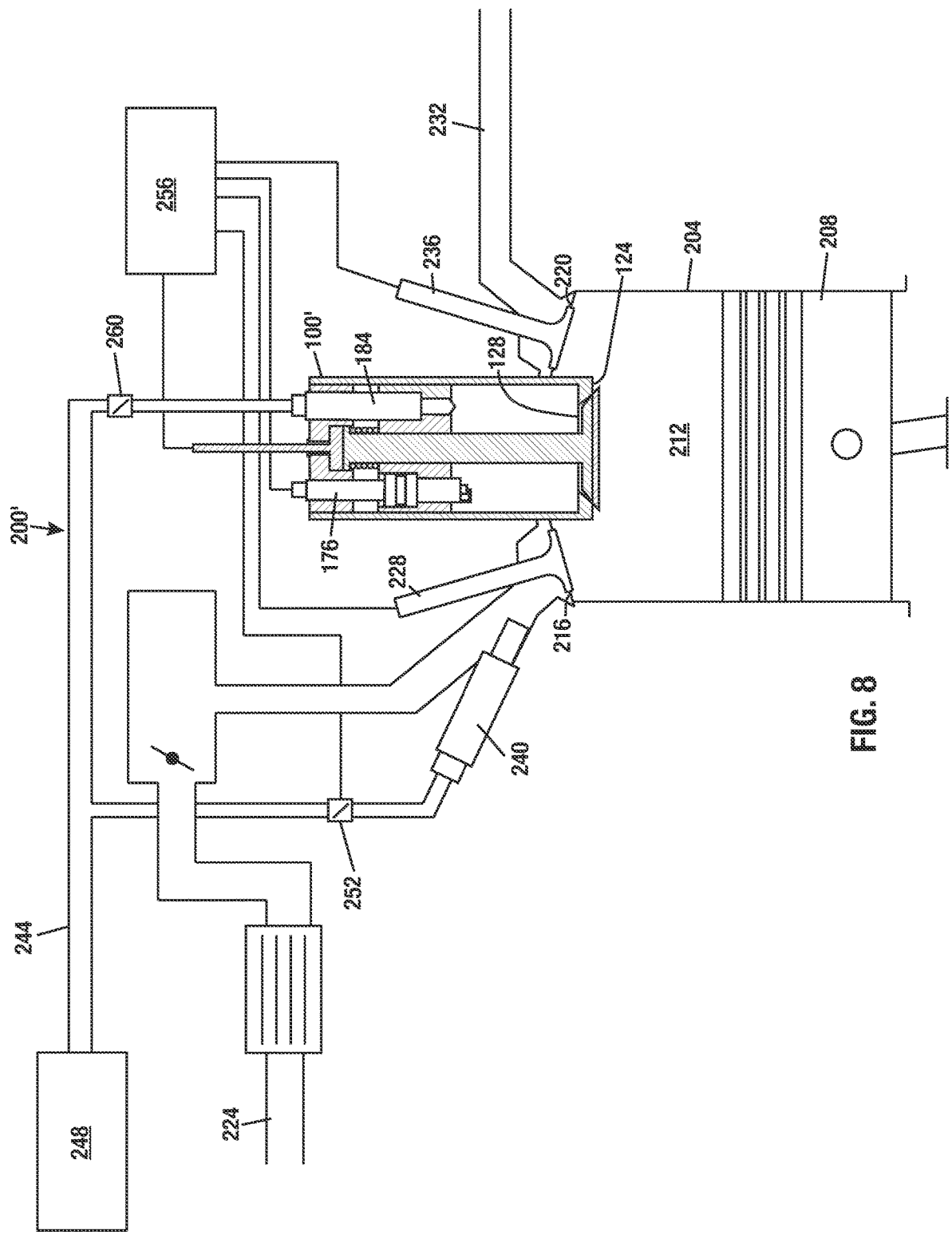
FIG. 8 is a schematic diagram showing the prechamber device of FIG. 7 operatively coupled to an internal combustion engine.

Prechamber device 100 shown in FIGS. 1-3 without a fuel injector may be described as a passive prechamber, whereas prechamber device 100' shown in FIG. 7 with fuel injector 184 may be described as an active prechamber. FIG. 8 shows engine 200' with prechamber device 100'. Engine 200' has virtually the same characteristics as engine 100 previously described in FIG. 4, with the exception that engine 200' includes features to deliver fuel to the active prechamber. In engine 200', fuel injector 184 of prechamber device 100' communicates with fuel line 244. A valve 260 may control flow of fuel from fuel line 244 into fuel injector 184. Valve 260 may be controlled by ECU 256. Prechamber device 100' operates similarly to prechamber device 100 during an engine cycle, as described with reference to FIGS. 5A-6C, with the exception that during the intake stroke, valve 260 will be opened to allow fuel to be delivered into precombustion chamber 116. This means that precombustion chamber 116 will receive fuel-air mixture from main combustion chamber 212 and additional fuel through fuel injector 184. During the compression, expansion, and exhaust strokes, valve 260 is closed.

The detailed description along with the summary and abstract are not intended to be exhaustive or to limit the embodiments to the precise forms described. Although specific embodiments, implementations, and examples are described herein for illustrative purposes, various equivalent modifications can be made without departing from the spirit and scope of the disclosure, as will be recognized by those skilled in the relevant art.

The invention claimed is:

1. A prechamber device comprising:
   an enclosure body having an orifice formed at a first end thereof;
   a cap disposed at a second end of the enclosure body, the cap and the enclosure body forming an enclosed volume;
   a precombustion chamber defined within the enclosed volume and fluidly connected to the orifice;
   a valve plug movable along an axial axis of the enclosure body to selectively adjust a valve opening at the orifice to a position in a range from a fully open position to a closed position; and
   an actuator coupled to the cap and the valve plug, the actuator controllable to displace the valve plug along the axial axis of the enclosure body,
   wherein the prechamber device is configured to intake a fuel and air mixture through the valve opening into the precombustion chamber.

2. The prechamber device of claim 1, further comprising a spark plug positioned to have a tip that is exposed to the precombustion chamber.

3. The prechamber device of claim 2, wherein the valve plug comprises a valve stem and a valve head disposed at one end of the valve stem, wherein the valve stem traverses the precombustion chamber and is movable along the axial axis of the enclosure body, and wherein a position of the valve head relative to a wall of the orifice is adjustable by movement of the valve stem along the axial axis of the enclosure body.

4. The prechamber device of claim 3, wherein the valve head engages the wall of the orifice when the valve opening is at the closed position.

5. The prechamber device of claim 4, further comprising a spring positioned to normally bias the valve head into engagement with the wall of the orifice.

6. The prechamber device of claim 3, further comprising a valve guide disposed within the enclosed volume, the valve guide having a first opening aligned to receive the valve stem and guide movement of the valve stem along the axial axis of the enclosure body.

7. The prechamber device of claim 6, wherein the precombustion chamber is defined in a portion of the enclosed volume between the valve guide and a portion of the enclosure body including the orifice, and wherein the spark plug extends through a second opening in the valve guide to expose the tip of the spark plug to the precombustion chamber.

8. The prechamber device of claim 6, wherein the spark plug extends into the enclosed volume through the cap.

9. The prechamber device of claim 2, further comprising a fuel injector positioned to have a nozzle that is exposed to the precombustion chamber.

10. The prechamber device of claim 9, wherein the fuel injector and the spark plug extend into the enclosed volume through the cap.

11. The prechamber device of claim 1, wherein the actuator is a solenoid actuator or a piezo actuator.

12. An internal combustion engine comprising:
   at least one engine cylinder having a main combustion chamber defined therein;
   an enclosure body having an orifice formed at a first end thereof, the enclosure body positioned relative to the at least one engine cylinder to expose the first end to the main combustion chamber;

a cap disposed at a second end of the enclosure body, the cap and the enclosure body forming an enclosed volume;

a precombustion chamber defined within the enclosed volume and fluidly connected to the orifice;

a valve plug movable along an axial axis of the enclosure body to selectively adjust a valve opening at the orifice to a position in a range from a fully open position to a closed position; and an actuator coupled to the cap and the valve plug, the actuator controllable to displace the valve plug along the axial axis of the enclosure body, wherein the internal combustion engine is configured to intake a fuel and air mixture through the valve opening into the precombustion chamber.

13. The internal combustion engine of claim 12, further comprising a spark plug coupled to the cap and positioned to have a tip that is exposed to the precombustion chamber.

14. The internal combustion engine of claim 13, further comprising a fuel injector coupled to the cap and positioned to have a nozzle that is exposed to the precombustion chamber.

15. A method of operating an internal combustion engine, the method comprising:

controlling a valve opening at an end of a prechamber device exposed to a main combustion chamber of an engine cylinder to a fully open position;

supplying a fuel and an air into the main combustion chamber to provide a fuel-air mixture inside the main combustion chamber;

where supplying the fuel and the air into the main combustion chamber also provides the fuel-air mixture into a precombustion chamber inside the prechamber device through the valve opening;

compressing the fuel-air mixture inside the main combustion chamber;

during at least a portion of compressing the fuel-air mixture inside the main combustion chamber, detecting an engine speed and an engine load and controlling the valve opening to a position in a range from the fully open position to a closed position based on the detected engine speed and engine load;

igniting the portion of the fuel-air mixture inside the precombustion chamber to generate turbulent jets that are directed from the precombustion chamber into the main combustion chamber through the valve opening;

combusting the compressed fuel-air mixture inside the main combustion chamber by the turbulent jets emanating from the prechamber device; and removing exhaust gases generated by combustion of the fuel-air mixture from the main combustion chamber.

16. The method of claim 15, further comprising:

controlling the valve opening to the position in the range from the fully open position to the closed position during an initial period of combusting the fuel-air mixture inside the main combustion chamber; and controlling the valve opening to the closed position during a remaining period of combusting the fuel-air mixture inside the main combustion chamber.

17. The method of claim 16, further comprising:

controlling the valve opening to the closed position during removing exhaust gases from the main combustion chamber.

18. The method of claim 15, wherein the portion of the fuel-air mixture inside the precombustion chamber is ignited while the valve opening is controlled to the position in the range from the fully open position to the closed position.

19. The method of claim 15, wherein the portion of the fuel-air mixture inside the precombustion chamber is ignited at a select time during compressing the fuel-air mixture inside the main combustion chamber.

20. The method of claim 15, further comprising:

directly injecting a fuel into the precombustion chamber from outside the main combustion chamber during at least a portion of providing the portion of the fuel-air mixture from the main combustion chamber to the precombustion chamber.

\* \* \* \* \*